(No Model.)
J. HERBY.
METHOD OF MAKING AXLE SKEINS.
No. 441,098. Patented Nov. 18, 1890.
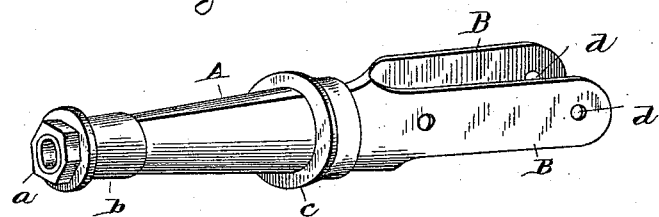
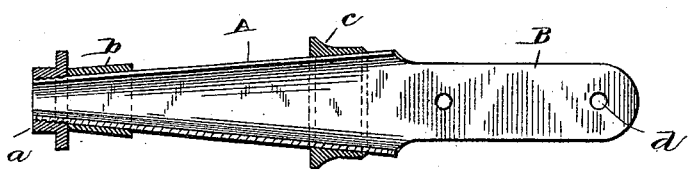
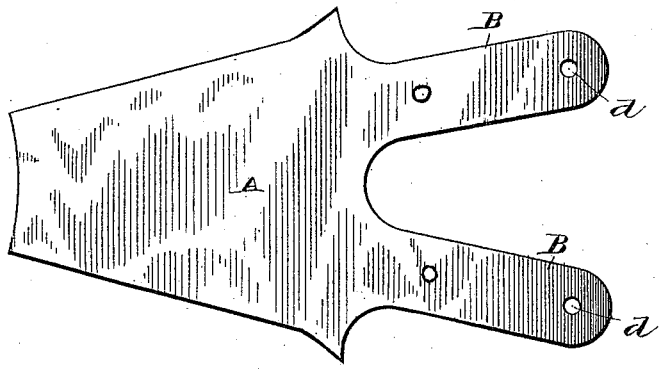
WITNESSES:
INVENTOR
John Herby
BY
Milo Harris
ATTORNEY

UNITED STATES PATENT OFFICE.

JOHN HERBY, OF JAMESTOWN, NEW YORK, ASSIGNOR TO MILO HARRIS AND WILLIS O. BENEDICT, OF SAME PLACE.

METHOD OF MAKING AXLE-SKEINS.

SPECIFICATION forming part of Letters Patent No. 441,098, dated November 18, 1890.

Application filed March 10, 1890. Serial No. 343,247. (No model.)

*To all whom it may concern:*

Be it known that I, JOHN HERBY, a citizen of the United States, residing at the city of Jamestown, in the county of Chautauqua and State of New York, have invented certain new and useful Improvements in the Method of Making Axle-Skeins; and I do hereby declare the following to be a full, clear, and exact description of the invention, such as will enable others skilled in the art to which it appertains to make and use the same.

My invention relates to the method of manufacturing steel skeins, and has for its first object the reducing the cost of manufacture; second, their durability and the facility of renewing the wearing parts, and, third, the expense saved to the manufacturer of wagons using the same, all of which will be fully understood by this specification and the accompanying drawings, in which—

Figure 1 is a perspective view of a skein; Fig. 2, a longitudinal section; Fig. 3, blank from which the skein is formed.

In the manufacture of steel skeins heretofore the method has been to form them from tubes, reducing the size of some parts and enlarging others, greatly to the detriment of their strength, or forming them up from sheet-metal blanks and welding them the entire length of the closed part of the skein, and in both cases metal plugs are welded in the end of the skein to receive the end nut, these plugs having a hole drilled through their center for the purpose of receiving a lag-screw to secure the end of the skein to the axle-wood. These methods are found expensive to the manufacturer of skeins, and also to the parties making the wagon, and are fully overcome by my improvement.

Fig. 3 in the drawings shows a metal blank, preferably of steel, and of suitable dimensions, that when formed the seam abuts together on the upper side of the skein, as shown at A, Fig. 1, the extra arms B B being the same as was secured to me by United States Patent No. 419,991, said arms having holes *d d*, through which bolts pass to secure the skein firmly to the axle.

C is a metal collar of suitable form, and when heated is driven on, and by its contraction not only stays in place to form the shoulder for the wheel-box, but draws the seam of the skein firmly together.

*b* is a long metal sleeve or ferrule, as shown in Figs. 1 and 2, which when heated is driven on the skein-spindle just back of the end nut *a*, and by its contraction not only stays securely in place, but draws the seam of the skein firmly together, and with the back collar holds the skein together, so that no welding is necessary, and, with the nut extending around the whole body of the skein at one end and bolts passing through the extension-arms at the other, all parts work together for the purpose of strengthening the skein.

The end of the main portion of the skein A is threaded on the outside to receive the nut *a*, as shown in Fig. 2, without reducing or any plug being necessary. The same tool that cuts the thread mills off the end of sleeve *b*, so as to form a good shoulder for the nut to press against. As the end of the skein-spindle is smaller, it has less bearing-surface than at the shoulder, and therefore wears faster; and by using this sleeve I get not only a larger wearing-surface, but when it gets worn may be readily driven off and a new one put on, thus virtually renewing the skein.

The box in the wheel is made to have a bearing about one-third the length of the spindle at its largest end and then come down in a true taper to have its small end have a bearing on the ferrule *b*, thus leaving an oil-chamber one-third the length of spindle, which is desirable. The nut *a* may be closed at its outer end, if desired. In securing the skein to the axle, the skein-fitter is set to let the end of the axle-wood come just to the end of the skein before the nut is put on. The holes in the axle-wood to receive the bolts through the extension-arms may be bored by machine, and all the time necessary to fit the skein is simply enough to drive the skein to place and put in the two bolts.

By my improvement the entire expense of welding the skein is dispensed with. The skeins being blanked out with dies are exact duplicates, and when formed into shape are of exact thickness throughout, which is not the case if welded. Expense of welding a plug and boring its entire length for a lag-screw is also saved, besides the very great advantage of cheaply renewing the skein by putting on a new sleeve when necessary.

The manufacturer of the wagon saves the lag-screws and time of putting them in, the drilling of skeins, and the large expense of hammering the tail portion of the skein down to the wood its entire length each side.

I claim—

1. The method of making axle-skeins, which consists in making the skein from sheet-metal blanks of suitable dimensions by rolling or turning them into shape to form the spindle and rear closed part, the edges abutting together on top of the skein, the seam being held together by a shoulder-collar and an end sleeve, substantially as shown and described.

2. The method of making axle-skeins, which consists in forming the skein from sheet-metal blanks of suitable dimensions by rolling or turning the main part to form the spindle and rear closed part, the edges abutting together on the upper side, a metal collar being shrunk on to form the shoulder for the wheel, and a sleeve or ferrule being shrunk on or otherwise securely fastened around the spindle near the end, forming the end bearing on which the wheel turns, substantially as shown, and for the purpose described.

3. The method of making axle-skeins, which consists in making the skein from sheet-metal blanks of suitable dimensions by rolling or turning the main part to form the spindle and rear closed part, the edges abutting together on top of the skein, said skein being held together by a shoulder-collar, as stated, the end of the spindle having a sleeve secured thereto, and a thread cut on its outer end, which receives the end nut, said spindle not being reduced in size, substantially as shown, and for the purpose set forth.

4. The method of making axle skeins, which consists in making the skein from metal blanks having long rear extensions, which are provided with holes to receive bolts for securing the same to the axle-wood, the blanks being turned to form the spindle and rear closed part abutting together on top, the seam being held together by a rear shoulder-collar and a suitable metal sleeve, which holds the end of spindle, said sleeve forming a shoulder for the end nut, substantially as shown, and for the purpose set forth.

In testimony whereof I affix my signature in presence of two witnesses.

JOHN HERBY.

Witnesses:
MILO HARRIS,
L. L. HANCHETT.